US005870728A

United States Patent [19]

Yatsuzuka et al.

[11] Patent Number: 5,870,728

[45] Date of Patent: Feb. 9, 1999

[54] LEARNING PROCEDURE FOR MULTI-LEVEL NEURAL NETWORK

[75] Inventors: Youtaro Yatsuzuka, Kanagawa; Masaru Enomoto, Saitama, both of Japan

[73] Assignee: Kokusai Denshin Denwa Co., Ltd, Tokyo, Japan

[21] Appl. No.: 906,169

[22] Filed: Aug. 5, 1997

[30] Foreign Application Priority Data

| | | | |
|---|---|---|---|
| Aug. 7, 1996 | [JP] | Japan | 8-223319 |
| Nov. 8, 1996 | [JP] | Japan | 8-311264 |

[51] Int. Cl.[6] .......... G06F 15/18

[52] U.S. Cl. .......... 706/25; 706/16

[58] Field of Search .......... 706/25, 31, 26, 706/28, 16

[56] References Cited

U.S. PATENT DOCUMENTS

| | | | |
|---|---|---|---|
| 5,075,868 | 12/1991 | Andes et al. | 706/25 |
| 5,103,496 | 4/1992 | Andes et al. | 706/25 |
| 5,129,038 | 7/1992 | Kohda et al. | 706/25 |
| 5,640,494 | 6/1997 | Jabri et al. | 706/25 |

OTHER PUBLICATIONS

Sang–Hoon Oh et al., Sensitivity analysis of single hidden–layer neural networks with threshold functions, IEEE transactions on neural network, vol. 6, No. 4., pp. 1005–1007, Jul. 1995.

Sang–Hoon Oh et al., Sensitivity of trained neural networks with threshold functions, IEEE Conference on neural networks, pp. 986–991., Jul. 2, 1994.

Szu et al., Control of chaos using neural networks, IJCNN–93, pp. 1781–1784 vol. 2., Oct. 1993.

Yatsuzuka, An error perturbation for learning and detection of local minima in binary 3–layered neural networks, 1995 IEEE Intl. Conference on Neural Network, pp. 63–68., Dec. 1, 1995.

*Primary Examiner*—Tariq R. Hafiz
*Assistant Examiner*—Sanjiv Shah
*Attorney, Agent, or Firm*—Nikaido Marmelstein Murray & Oram, LLP

[57] ABSTRACT

A reiterative learning procedure with training and test processes for a binary supervised neural network includes at least an error signal generator for weighting factor updating in the training process, which generates an error signal that is perturbed in polarity and amplitude in the difference derived by subtracting an output unit signal from corresponding binary teacher signal and then generates the difference as an error signal after a maximum absolute value of differences among erroneous binary output signals has become smaller than a threshold once. A training signal memory stores a set of training signals and adds test signals providing erroneous binary output signals that are transferred from a test signal memory in the test process to the set of training input signals as incremental training input signals. An affordable signal memory stores input signals with sufficiently large margins providing correct binary output signals that are transferred from the training signal memory in the training process and the test signal memory in the test process. The reiterative learning procedure, with minimum necessary training and test input signals and control of the error perturbation in the training process, can provide a binary space to obtain a desired binary output, and also realizes an extremely high generalization ability.

12 Claims, 3 Drawing Sheets

LEARNING PROCEDURE FOR MULTI-LEVEL NEURAL NETWORK

BACKGROUND OF THE INVENTION

The present invention relates to learning methods for multi-level neural networks which are applied to large scale logic circuits, pattern recognizers, associative memories, code converters and image processors, providing a desired output signal stably and quickly with an extremely high generalization ability by an iterative learning procedure consisting of a training process and a test process.

One such neural network is a multi-layered neural network, in which a back-propagation algorithm has been widely used as a supervised training method for the neural network. In a prior training process, as shown in FIG. 1, a set of input signals related to teacher signals is divided into a set of training input signals in a training signal memory 10 with a set of corresponding teacher signals and a set of test input signals in a test signal memory 11 with a set of corresponding teacher signals.

In the training process, the set of training input signals and the set of corresponding teacher signals are provided to a terminal 2 and a terminal 3 through an input selector 12. The multi-layered neural network 1 starts to train after setting initial conditions under the control of a mode controller 9, and outputs output unit signals from the output units of an output layer.

In an error signal generator 4, a difference signal as an error signal is derived by subtracting the output unit signal replying to the training input signal from a teacher signal T (teacher signal element: $T_1$, $T_2$, . . . , $T_M$) through a subtractor. The difference signal is then fed into a weighting factor controller 5. The weighting factors between adjacent layers are then updated by using the output unit signal and the difference signal to minimize the power of the difference signal in the weighting factor controller 5, and are set again in the multi-layered neural network 1.

A binary output unit signal is obtained through a binary threshold means 6 as an output signal at 7 from the output unit signal. By detecting the coincidence between the teacher signal and the binary output unit signal in an error pattern detector 8, it is determined whether the multi-layered neural network 1 achieved convergence or not. These procedures are repeated in the training process until convergence in binary space is achieved.

In the training process, updating of weighting factors is repeatedly performed for the set of training input signals to achieve convergence of the multi-layer neural network 1. A minimum power of the difference signal can provide complete convergence of the neural network in binary space, resulting in coincidence between the set of binary output unit signals replying to the set of training input signals and the set of teacher signals.

The updating speed of the weighting factors becomes gradually slower due to small gradients for input values very close to 0 and 1 in a sigmoidal transfer function in the weighting factor controller 5. When a state minimizing the power of the difference signal in local minima has been captured once, global minima cannot be obtained even if the training cycles are increased, or a significantly large number of training cycles is necessary to obtain the global minima. Namely, the multi-layered neural network 1 is frequently captured in a very tenacious state trapped in local minima. Dependency on initial conditions of the weighting factors is also one of the problems in achieving quick convergence.

A second prior training process comprises an updating of weighting factors by using an error signal generated by an error perturbation method in the error signal generator 4. In the error perturbation method, when the absolute value of the difference signal derived by subtracting the output unit signal from the corresponding teacher signal is equal to or smaller than a given threshold $D_1$ for a correct binary output unit signal, the error signal has an opposite polarity to that of the difference signal and an amplitude smaller in proportion to that of the difference, and when the absolute value is larger than the threshold $D_1$ for a correct binary output unit signal, the error signal has the same polarity as that of the difference signal and an amplitude smaller by $D_1$ than that of the difference signal.

On the other hand, for an erroneous binary output unit signal, the weighting factor is also updated by using an error signal which has the same polarity as that of the difference signal and an amplitude smaller by a threshold $D_2$ than that of the difference signal.

The difference signal on the m-th output unit is given by $T_m-Y_m$, where $Y_m$ is the output unit signal on the m-th output unit, $T_m$ is the binary teacher signal on the m-th output unit (0 or 1) and 1<m<M, and M is a number of output units. The error signal $E_m$ on the m-th output unit in the error perturbation is given by the following equations.

If the binary output unit signal on the m-th output unit is correct because of the coincidence with the binary teacher signal $T_m$, $E_m$ is given by (1), $$E_m=T_m-Y_m-D_1*sgn(T_m-Y_m), \quad (1)$$

and if the binary output unit signal on the m-th output unit is wrong because of the distinction from the binary teacher signal $T_m$, then $$E_m=T_m-Y_m-D_2*sgn(T_m-Y_m), \quad (2)$$

where $$\begin{aligned} \mathrm{sgn}(x) &= 1 \text{ for } x \geqq 0, \\ &= -1 \text{ for } x < 0, \end{aligned}$$

and $0.5 \geqq D_1, D_2 \geqq 0$.

In the training process, updating of weighting factors is repeatedly conducted to achieve convergence for the set of training input signals. By detecting the coincidence between the set of teacher signals and the set of binary output unit signals in the error pattern detector 8, it is determined whether the multi-layered neural network 1 achieved convergence in binary space or not. These procedures are repeated in the training process until the coincidence is achieved. When the coincidence has been once detected, the coincidence signal is fed into the mode controller 10 to terminate the training process.

The first prior training process which is equivalent to the second prior training process with $D_1$ and $D_2$=0 has defects that it is very difficult to quickly achieve complete convergence in binary space due to the easy capture of tenacious states trapped in local minima and the difficulty of slipping away from it, as aforementioned.

Only the second prior training process can converge with the correct set of binary output unit signals for the set of training input signals without being trapped in the tenacious state with local minima. However, a large number of training cycles is sometimes required to achieve convergence for a large number of training input signals. When the number of binary errors in the binary output unit signals quickly has become small once, further reduction of the number of binary errors becomes very slow and the convergence speed eventually stagnates even if the weighting factors are updated by using the error perturbation method to evade the tenacious state trapped in local minima. This is because the error perturbation with large values of $D_1$ and $D_2$ introduces disturbance in the optimized weighting factors, which results from reduction of the margin providing the correct binary output unit signal by $D_1$ in the previous error perturbation.

In particular, a general design method for achieving reliable and very quick convergence has not been established yet for either a three layered or multi-layered neural network having a large number of input nodes and a small number of hidden nodes.

In the test process, the mode controller 9 controls the input selector 13 to switch the process from the training process to a test process to evaluate the generalization ability. Also, the set of test input signals is fed to the terminal 2 and the corresponding teacher signals are fed to the terminal 3 through the input selector 12. In the error pattern detector 8, the binary output unit signal is compared with the corresponding teacher signal to detect an erroneous binary output unit signal.

If the multi-layered neural network 1 does not converge in binary space due to trapping in the local minima, a very low generalization property is obtained due to the large number of erroneous binary output unit signals for the set of test input signals. Even if the neural network with the prior error perturbation method is converged in binary space, an extremely high generalization property with 100% correctness, in which the set of binary output unit signals is entirely correct for the set of test input signals, is not necessarily achieved. A large number of erroneous binary output signals is produced for a set of test input signals with a large volume due to the reduction of the margin by $D_1$ for providing correct binary output unit signals. There is also another reason, that is the non-optimum allocation of the set of input signals to the sets of training and test input signals.

A general learning method of the binary multi-layered neural network, which can achieve both complete convergence in binary space for the set of training input signals and also achieve 100% generalization for the set of test input signals, has not been established.

As aforementioned, earlier learning procedures for a multi-layered neural network have the disadvantages that either a huge number of training cycles for updating weighting factors is required to achieve convergence due to a stagnation of convergence speed caused by the error perturbation, or convergence cannot be obtained even by continuing the training process due to trapping in tenacious states with local minima and cannot also necessarily achieve an extremely high generalization ability.

Particularly, an easy and reliable learning method for a multi-level neural network with a large number of input units, a small number of output units and a teacher pattern having a distributed representation, which has the difficulty of achieving both complete convergence in binary space with a very small number of training cycles and very high generalization, has not been established. The generalization ability generally degrades due to a surplus number of hidden units and over-learning, whereas the use of a large number of hidden units can make the neural network stably converge. These approaches also inevitably require a huge amount of computations and a very large hardware complexity.

These shortcomings make it very difficult to realize multi-level neural networks for real time applications which require a very high generalization ability for unknown input signals and retrain the neural network for newly obtained input signals providing erroneous output signals.

SUMMARY OF THE INVENTION

It is an objects therefore, of the present invention to overcome the disadvantages and limitations of prior learning procedures for multi-level neural networks by providing a new and improved learning procedure.

It is also an object of the present invention to provide a learning procedure for a multi-level neural network with a small number of hidden units which has rapid and reliable convergence in multi-level space within a very small number of training cycles, and also has an extremely high generalization ability.

The learning procedure of multi-level neural networks using the present invention can resolve problems related to convergence and generalization by achieving a stable and quick convergence 100 to 10000 times faster than that of the prior learning procedure, achieve 100% generalization for test input signals and also achieve a very high generalization ability for unknown input signals.

A new learning procedure for the supervised multi-level neural network comprises at least an error signal generator 4 for updating of weighting factors in a training process, which generates an error signal that is perturbed in polarity and amplitude in the difference derived by subtracting an output unit signal from the corresponding teacher signal and then generates the same error signal as the difference after a maximum absolute value of differences among erroneous multi-level output unit signals has become smaller than a threshold once, and a maximum error detector 14 in which a stagnation of convergence speed is detected by comparing the maximum absolute value of the differences among erroneous multi-level output unit signals to the threshold.

Another new learning procedure for the supervised multi-level neural network comprises at least a reiterative procedure with training and test processes, a training signal memory 18 which stores a set of training signals and adds test signals providing erroneous multi-level output unit signals for a set of test input signals, which are transferred from a test signal memory 19 in the test process, to the set of training input signals as incremental training input signals, and a test signal memory 19 which stores the set of test input signals for the test process.

Another new learning procedure for the supervised multi-level neural network comprises at least a reiterative procedure with training and test processes, a training signal memory 23 which stores a set of training signals and adds test signals providing erroneous multi-level output unit signals for a set of test input signals, which are transferred from a test signal memory 24 in the test process to the set of training input signals as incremental training input signals, and the test signal memory 24 which stores a set of test signals for a test process, and an affordable signal memory 25 which stores input signals with sufficiently large margins providing correct multi-level output signals that are transferred from either the training signal memory 23 in the training process or the test signal memory 24 in the test process, or from both the training and test signal memories 23, 24.

Generalization performance for input signals stored in the affordable signal memory 25 may be evaluated after no error in the multi-level output unit signals for the test input signals is achieved in the test process. If there are errors in the multi-level output unit signals for the input signals input from the affordable signal memory 25, the input signals producing erroneous multi-level output signals is removed to the training signal memory 23 for training.

In the reiterative learning procedure, necessary minimum numbers of training and test input signals are consequently stored in the training and test signal memories 23, 24, input signals are optimally allocated between the training signal, test signal and affordable signal memories 23, 24, 25 and the control of the amount of error perturbation in the training process provides very rapid convergence without stagnation of convergence speed. These results realize a multi-level neural network with a small number of hidden units which converges very quickly and reliably in multi-level space without dependency on the initial conditions of weighting factors, and has a very high generalization ability without over-learning. The reiterative learning procedure by achieving complete convergence in multi-level space for the set of training input signals and also 100% generalization for the set of test input signals can provide a extremely high generalization ability for unknown input signals.

Real time neural network systems with learning capability and minimum complexity for multi-level logic systems having a large number of inputs, pattern recognizers, image processors and data converters can be easily implemented by using multi-level neural networks with the invented reiterative learning procedures.

BRIEF DESCRIPTION OF THE DRAWINGS

The foregoing and other objects, features, and attendant advantages of the present invention will be appreciated as the same become better understood by means of the following descriptions and accompanying drawings wherein.

DESCRIPTION OF THE PREFERRED EMBODIMENTS

In the detailed descriptions given hereafter, the following embodiments of an iterative learning procedure for a multi-level neural network according to the present invention are illustrated for structures having only binary (two levels) input and teacher signals.

Descriptions of the reiterative learning procedure are separately given for the training and test processes, respectively.

(Embodiment 1)

Figure 1:
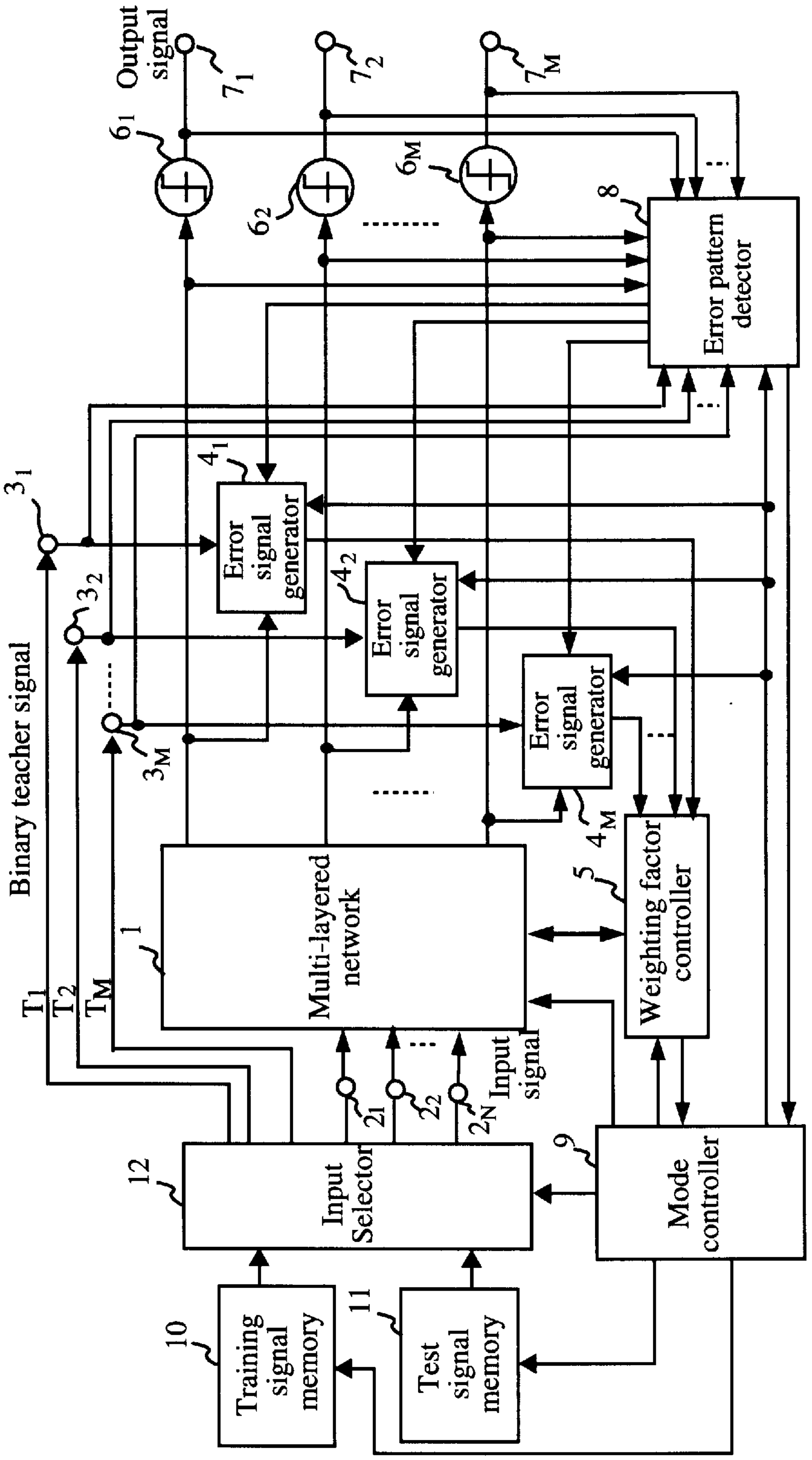
FIG. 1 is a functional diagram of a binary neural network with the first prior learning procedure.
Figure 2:
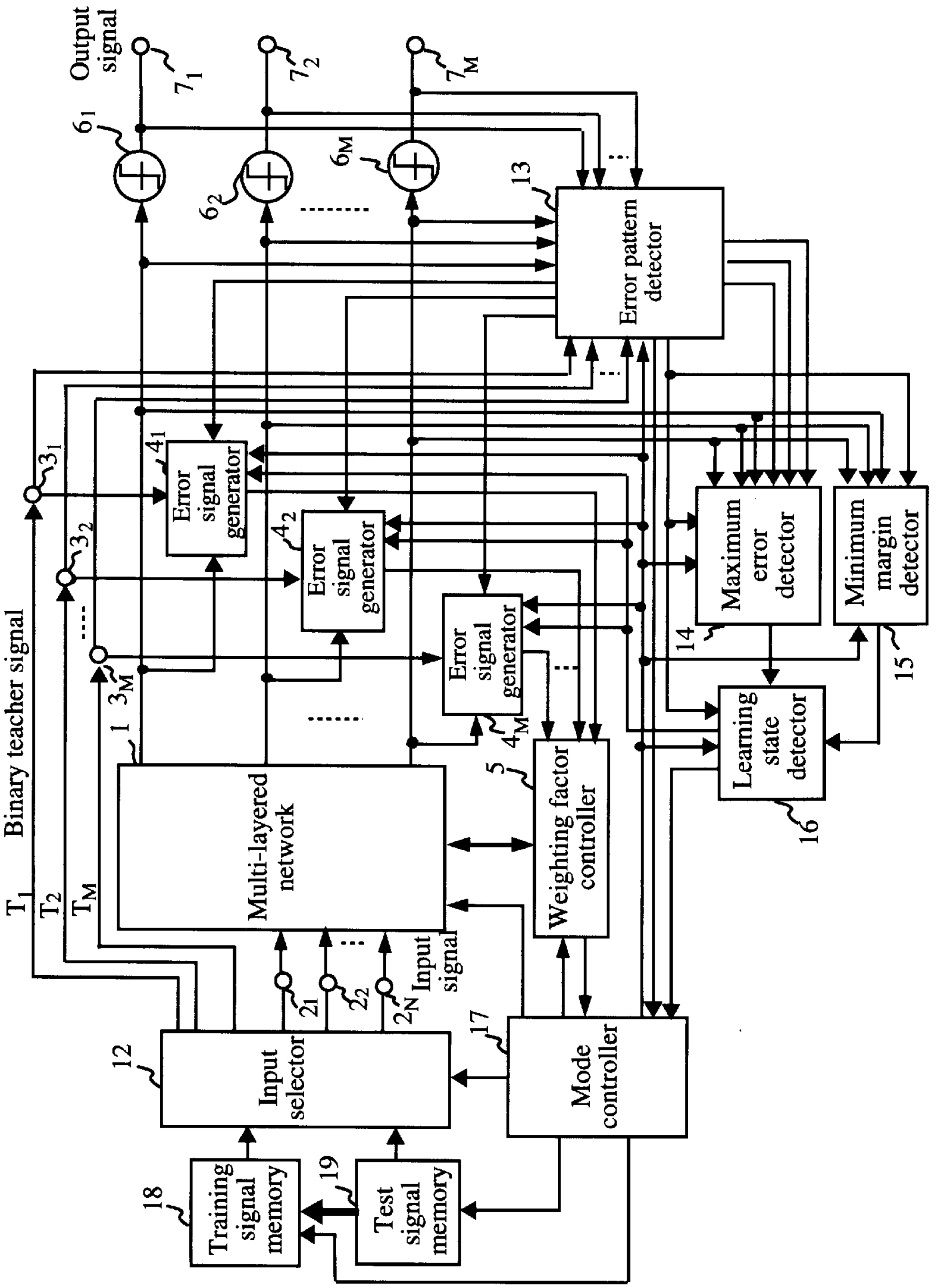
FIG. 2 is a functional diagram of a first embodiment of a reiterative learning procedure for a binary neural network according to this invention.

A binary neural network for a reiterative procedure according to the first embodiment of the present invention, is illustrated in FIG. 2. In the reiterative procedure a training process is conducted first and a test process is conducted afterward. These processes are reiteratively performed. In the training process, the network comprises a multi-layered neural network 1 in which a training input signal is fed through a terminal 2 and an input selector 12 from the training signal memory 18, a binary teacher signal T is also fed to a terminal 3 through the input selector 12 from the training signal memory 18 and an output unit signal from an output unit is provided to an error signal generator 4 and to a binary threshold means 6, the error signal generator 4 which generates an error signal by using the output unit signal, the binary teacher signal and an error discrimination signal derived from an error pattern detector 13, the binary threshold means 6 which outputs a binary output unit signal converted into a binary form through a level threshold from the output unit signal, a weighting factor controller 5 in which weighting factors are iteratively updated, the error pattern detector 13 which outputs the error discrimination signal, and a coincidence signal which indicates full coincidence between the set of binary output unit signals and the set of corresponding teacher signals and control signals for terminating the test process and removing a test input signal and the corresponding teacher signal to the training signal memory 18 from the test signal memory 19, a maximum error detector 14 which detects a maximum absolute value of the differences (a maximum error) between the output unit signal and the corresponding teacher signal in a set of erroneous binary output unit signals indicated by the error discrimination signal from the error pattern detector 13, a minimum margin detector 15 which detects a minimum absolute value of the differences (a minimum margin) between the output unit signal and the decision level of the binary threshold means 6 in the set of correct binary output unit signals denoted by the coincidence signal derived from the error pattern detector 13, a learning state detector 16 in which the minimum margin from the minimum margin detector 15, the maximum error from the maximum error detector 14 and the coincidence signal from the error pattern detector 13 are obtained, and control signals for changing error perturbation parameters $D_1$ and $D_2$ in the error signal generator 4 and for terminating the training process are also output, a mode controller 17 which controls the multi-layered neural network 1, the weighting factor controller 5, the error pattern detector 13, the maximum error detector 14, the minimum margin detector 15, the learning state detector 16, a training signal memory 18, a test signal memory 19 and an input selector 12 to conduct iteratively the training process and the test process in the reiterative learning procedure, the training signal memory 18 which stores the set of training input signals with the set of corresponding teacher signals and outputs these signals in the training process to the input selector 12, the test signal memory 19 which stores the set of test input signals with the set of corresponding teacher signals and outputs these signals in the test process to the input selector 12, and the input selector 12 which provides the input signals to the terminal 2 and the corresponding teacher signals to the terminal 3 from either the training signal memory 18 or the test signal memory 19 according to the control signal from the mode controller 17.

The reiterative learning procedure which sequentially performs the training and test processes and reiteratively conducts these processes until complete convergence in binary space and 100% generalization are achieved for given input signals. The learning procedure is described hereafter.

All the binary patterns having a distributed representation which can be allocated to the output units are prepared as a set of teacher signals. In the training signal memory 18, only core training input signals corresponding to each of the teacher signals are stored as an initial set of training input signals with a set of corresponding teacher signals, and the rest of the attained input signals are stored as an initial set of test input signals with a set of corresponding teacher signals in the test signal memory 19.

In the training process, the set of training input signals and the set of corresponding teacher signals are fed to the terminal 2 and 3, respectively through the input selector 12 from the training signal memory 18. The neural network 1 provides the output unit signal to the error signal generator 4 and the binary threshold means 6 through the output unit.

In the error signal generator 4, the error signal is generated by using the output unit signal and the teacher signal, based on the error discrimination signal from the error pattern detector 13 according to the error perturbation algorithm given in Eq.(1) and Eq.(2), and is then fed to the weighting factor controller 5 for updating the weighting factors.

The error discrimination signal from the error pattern detector 13 indicates whether or not a binary error in the binary output unit signal in each output unit exists by comparing the binary unit output signal obtained through the binary threshold means 6 with the corresponding binary teacher signal in each output unit.

In the error signal generator 4, in the output unit providing a erroneous binary output unit signal, an error signal which has the same polarity as that of the difference signal derived from subtracting the output unit signal from the corresponding binary teacher signal and an amplitude reduced by $D_2$ from that of the difference signal is generated as given in Eq. (2).

On the other hand, when the absolute value of the difference signal is smaller than $D_1$ in the output unit providing a correct binary output unit signal, an error signal having the opposite polarity and an amplitude equal to or smaller than $D_1$ in inverse proportion to the distance from the binary teacher signal is generated for error perturbation as given in Eq.(1), and when the absolute value of the difference signal is larger than $D_1$, an error signal having the same polarity as that of the difference signal and an amplitude reduced by $D_1$ from that of the difference signal is also generated as given in Eq.(1).

In the error pattern detector 13, a coincidence signal is also output to the learning state detector 16 and the minimum margin detector 17 when full coincidence between the set of binary output unit signals and the set of corresponding binary teacher signals for the set of training input signals is achieved.

Whenever the maximum error in the erroneous binary output unit signals derived from the maximum error detector 14 falls below a threshold, the learning state detector 16 outputs a control signal to the error signal generator 4 to reduce the values of the error perturbation parameters of $D_1$ and $D_2$.

In the training process $D_1$ and $D_2$ are finally set to 0, corresponding to direct use of the difference signal as the error signal without the error perturbation. Through these procedures the convergence speed is improved due to the gradual decrease in values of the error perturbation parameters according to the progress in updating the weighting factors without being trapped in the local minima and moreover without stagnation of convergence speed. Momentum and/or a learning factor may also be respectively adjusted simultaneously to smaller values for further improving the convergence speed.

After achieving convergence in binary space providing full coincidence between the set of binary output unit signals and the set of corresponding binary teacher signals for the set of training input signals without error perturbation, when the minimum margin in the correct binary output unit signals derived from the minimum margin detector 15 exceeds a threshold in the learning state detector 16, the training process is terminated according to the control signal from the learning state detector 16 to the mode controller 17.

The mode controller 17 then controls the input selector 12 to switch the process from the training process to the test process to evaluate the generalization ability for the set of test input signals fed from the test input memory 19. In the test process, the set of test input signals is fed to the terminal 2 and the set of corresponding teacher signals is also fed to the terminal 3, respectively. Any weighting factors are not updated in the test process.

In the error pattern detector 13, the binary output unit signal is compared to the corresponding teacher signal. If an erroneous binary unit output is detected, a control signal is output to the mode controller 17 in order to remove the corresponding test input signal from the test signal memory 19 to the training signal memory 18 for merging it with the set of training input signals as incremental training input signals for re-training the neural network 1 in the reiterative learning procedure.

After the test process has been completed for the set of test input signals, if the erroneous binary unit output is detected in the error pattern detector 13, the training process is performed again. The neural network 1 is re-trained for the new set of training input signals merged with the incremented input signals, and then the test process is also performed after achieving convergence in binary space again in the training process, as aforementioned.

The neural network 1 may also be rapidly converged in the retraining process with the initial conditions of $D_1$=0 and $D_2$=0, and by introducing the error perturbation if the maximum error exceeds a threshold within a given number of training cycles and then setting $D_1$=0 and $D_2$=0 again once the maximum error exceeds the other threshold.

Until no erroneous binary output unit signal is detected for the set of test input signals in the test process, the re-training process and the re-test process are iteratively conducted in the reiterative learning procedure.

According to the above procedure, complete convergence in binary space for the set of training input signals including the core and incremented training input signals is always achieved without stagnation of convergence speed in training, and 100% generalization is also finally achieved for the set of test input signals in a very small number of reiterations without over-learning.

The input signals which lie around classification boundaries are efficiently merged with the set of core training input signals through the re-test process, and are trained effectively through the re-training process in the reiterative procedure. The unsuitable assignment of the set of attained input signals to sets of training and test input signals in the training process of the prior art can be thus resolved.

As aforementioned, there is no stagnation in convergence speed under the condition of the maximum error having a value smaller than the threshold. A complete convergence in binary space 100 to 10000 times faster than that in the previous learning method and an extremely high generalization ability are achieved for the set of input signals without over-learning for a wide range of numbers of hidden units by control of the minimum margin in correct binary output unit signals, and by effectively removing the input signals which lie around classification boundaries to the training signal memory 18 for training.

Accordingly, the binary neural network with the invented reiterative learning procedure can realize very stable convergence in binary space for sets of input signals in the ranges of the classification boundaries, and also provide 100% generalization for the attained input signals with drastic reduction of the amount of computation, resulting on an extremely high generalization for unknown input signals.

For the expansion to a neural network handling more multi-levels than 2, it is only necessary to utilize a multi-level teacher signal having a number of levels greater than 2, and multi-level threshold means instead of the binary threshold means 6.

The present invention related to the learning procedure can also be widely applied to neural networks handling continuous signals by preparing ranges in which the output unit signal is considered to be correct for the teacher signal. The same equations as Eq.(2) and (3) can be applied when the threshold $D_1$ is defined as the region in which the output unit signal is very close to the corresponding teacher signal. The neural network can also be regarded as being convergent, providing correct output signals, when all the output signals are located within a range given by a threshold.

Though detailed descriptions were given only for a multi-layered neural network, this invention can be applied to other supervised neural networks with teacher signals.

(Embodiment 2)

Figure 3:
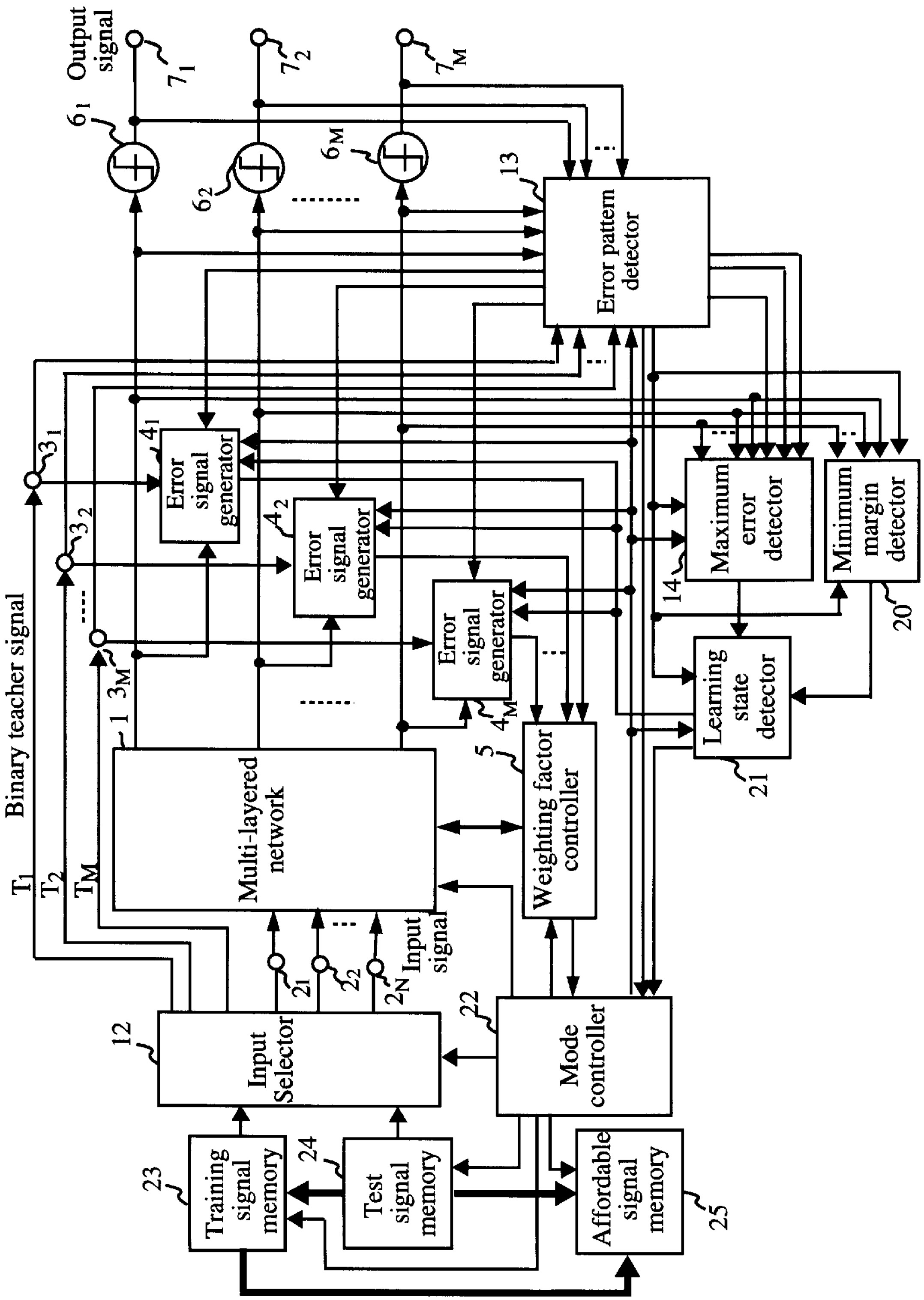
FIG. 3 is a functional diagram of a second embodiment of a reiterative learning procedure for a binary neural network according to this invention.

A binary neural network for the iterative learning procedure according to the second embodiment of the present invention, is illustrated in FIG. 3. In the reiterative procedure a training process is conducted first and a test process is then conducted. These processes are reiteratively performed. In the training process, the network comprises a multi-layered neural network 1 in which a training input signal is fed through a terminal 2 and an input selector 12 from the training signal memory 23, a binary teacher signal T is also fed to a terminal 3 through the input selector 12 from the training signal memory 23 and an output unit signal from an output unit is provided to an error signal generator 4 and to a binary threshold means 6, the error signal generator 4 which generates an error signal by using the output unit signal, the binary teacher signal and an error discrimination signal derived from an error pattern detector 13, the binary threshold means 6 which outputs a binary output unit signal converted into a binary form through a level threshold from the output unit signal, a weighting factor controller 5 in which weighting factors are iteratively updated, the error pattern detector 13 which outputs the error discrimination signal, and a coincidence signal which indicates full coincidence between the set of binary output unit signals and the set of corresponding teacher signals and control signals for terminating the test process and for removing a test input signal and the corresponding teacher signal to the training signal memory 23 from the test signal memory 24, a maximum error detector 14 which detects a maximum absolute value of the differences (a maximum error) between the output unit signal and the corresponding teacher signal in a set of erroneous binary output unit signals denoted by the error discrimination signal from the error pattern detector 13, a minimum margin detector 20 which obtains a minimum absolute value of the differences between the output unit signal and the decision level of the binary threshold means 6 in correct binary output unit signals as an output unit minimum margin for every training and test input signals and also detects a minimum value among the output unit minimum margins as a minimum margin when the coincidence signal is fed from the error pattern detector 13, a learning state detector 21 in which the minimum margin and the output unit margin from the minimum margin detector 20, the maximum error from the maximum error detector 14 and the coincidence signal from the error pattern detector 13 are obtained, and control signals for changing error perturbation parameters $D_1$ and $D_2$ in the error signal generator 4 and for terminating the training process are also output, a mode controller 22 which controls the multi-layered neural network 1, the weighting factor controller 5, the error pattern detector 13, the maximum error detector 14, the minimum margin detector 20, the learning state detector 21, a training signal memory 23, a test signal memory 24, an affordable margin memory 25 and an input selector 12 to iteratively conduct the training process and the test process in the reiterative learning procedure, the training signal memory 23 which stores the set of training input signals with the set of corresponding teacher signals and outputs these signals for the training process to the input selector 12, the test signal memory 24 which stores the set of test input signals with the set of corresponding teacher signals and outputs these sets for the test process to the input selector 12, an affordable signal memory 25 which stores input signals removed from either the training signal memory 23 or the test signal memory 2, and the input selector 12 which provides the input signals to the terminal 2 and the corresponding teacher signals to the terminal 3 from either the training signal memory 23 or the test signal memory 24 according to the control signal from the mode controller 22.

The iterative learning procedure which sequentially performs the training and test processes and reiteratively conducts these processes until complete and convergence in binary space and 100% generalization are achieved for given input signals. The learning procedure is described hereafter.

All the binary patterns having a distributed representation which can be allocated to the output units are prepared as the set of teacher signals. In the training signal memory 23, only core training input signals corresponding to each of the teacher signals are stored as an initial set of training input signals with the corresponding teacher signals, and the rest of the attained input signals are stored as an initial set of test input signals with a set of corresponding teacher signals in the test signal memory 24.

In the training process, the set of training input signals and the set of corresponding teacher signals are fed to the terminal 2 and 3, respectively through the input selector 12 from the training signal memory 23. The neural network 1 provides the output unit signal to the error signal generator 4 and the binary threshold means 6 through the output unit.

In the error signal generator 4, the error signal is generated by using the output unit signal and the teacher signal, based on the error discrimination signal from the error pattern detector 13 according to the error perturbation algorithm given in Eq.(1) and Eq.(2), and is then fed to the weighting factor controller 5 for updating the weighting factors.

The error discrimination signal from the error pattern detector 13 indicates whether or not an error in the binary output unit signal in each output unit exists by comparing the binary unit output signal obtained from the binary threshold means 6 with the corresponding binary teacher signal in each output unit.

In the error signal generator 4, in the output unit providing an erroneous binary output unit signal, an error signal which has the same polarity as that of the difference signal derived from subtracting the output unit signal from the corresponding binary teacher signal and an amplitude reduced by $D_2$ from that of the difference signal is generated as given in Eq.(2).

On the other hand, when the absolute value of the difference signal is smaller than $D_1$ in the output unit providing a correct binary output unit signal, an error signal having the opposite polarity and an amplitude equal to or smaller than $D_1$ in inverse proportion to the distance from the binary teacher signal is generated for error perturbation as given in Eq.(1), and when the absolute value of the difference signal is larger than $D_1$, an error signal having the same polarity as that of the difference signal and an amplitude reduced by $D_1$ from that of the difference signal is also generated as given in Eq.(1).

In the error pattern detector 13, a coincidence signal is also output to the learning state detector 16 and the minimum margin detector 17 when full coincidence between the set of binary output unit signals and the set of corresponding binary teacher signals for the set of training input signals is achieved.

Whenever the maximum error in the erroneous binary output unit signals derived from the maximum error detector 14 falls below a threshold, the learning state detector 21 outputs a control signal to the error signal generator 4 to reduce the values of the error perturbation parameters of $D_1$ and $D_2$.

In the training process $D_1$ and $D_2$ are finally set to 0, corresponding to direct use of the difference signal as the error signal without the error perturbation. Though these procedures, the convergence speed is improved due to the gradual decrease in values of the error perturbation parameters according to the progress in updating the weighting factors without being trapped in the local minima and moreover without stagnation of convergence speed. Momentum and/or a learning factor may also be respectively adjusted simultaneously to smaller values for further improving the convergence speed.

After achieving convergence in binary space providing full coincidence between the set of binary output unit signals and the set of corresponding binary teacher signals for the set of training input signals without error perturbation, when the minimum margin in the correct binary output unit signals derived from the minimum margin detector 15 exceeds a threshold in the learning state detector 21, the training input signals which provide the output unit signal having the output unit minimum margin exceeding a threshold are removed from the training signal memory 23 to the affordable signal memory 25 according to the control signal from the learning state detector 21 through the mode controller 22, and the training process is then terminated.

The mode controller 22 then controls the input selector 12 to switch the process from the training process to the test process to evaluate the generalization ability for the set of test input signals fed from the test signal memory 24. In the test process, the set of test input signals is fed to the terminal 2 and the set of corresponding teacher signals is also fed to the terminal 3, respectively. Any weighting factors are not updated in the test process.

In the error pattern detector 13, the binary output unit signal is compared to the corresponding teacher signal. If an erroneous binary unit output is detected, a control signal is output to the mode controller 22 in order to remove the corresponding test input signal from the test signal memory 24 to the training signal memory 23 for merging it with the set of training input signals as incremental training input signals for re-training the multi-layered neural network 1 in the reiterative learning procedure.

The test input signals providing the correct binary output unit signals of which the output unit margin exceeds the threshold are also removed from the test signal memory 24 to the affordable signal memory 25 in the test process. The threshold may be decreased according to the progress of the reiteration After the test process has been completed for the set of test input signals, if the erroneous binary unit output is detected in the error pattern detector 13, the training process is performed again after removing the test input signal providing the erroneous binary unit output to the training signal memory 23 from the test signal memory 24. The neural network 1 is re-trained for the new set of training input signals merged with the incremented input signals, and the test process is also performed after achieving convergence in binary space again in the training process, as aforementioned.

Until no erroneous binary output unit signal is detected for the set of test input signals in the test process, the re-training process and the re-test process are iteratively conducted in the reiterative learning procedure.

According to the above procedure, complete convergence in binary space for the set of training input signals including the core and incremental training input signals is always achieved without stagnation of convergence speed in training, and 100% generalization is also finally achieved in a very small number of reiterations without over-learning. The input signals which lie around classification boundaries are efficiently merged with the set of core training input signals through the re-test process, and are also trained effectively in the re-training process in the reiterative procedure. The unsuitable assignment of the set of attained input signals to sets of training and test input signals in the training process of the prior art can thus be resolved.

Input signals which have a sufficiently large margin from the classification boundaries except the core training input signals have been removed from the training and test signal memories 23, 24 to the affordable signal memory 25, resulting in a drastic reduction of the amount of necessary computation in the above procedure. The removal of the input signals from either the training signal memory 23 or the test signal memory 24 to the affordable signal memory 25 may also effective to reduce the amounts of computation.

Training input signals which have large margins may also be removed as incremental test signals from the training signal memory 23 to the test signal memory 24 instead of directly to the affordable signal memory 25 to confirm that they provide correct binary output unit signals.

After achieving convergence for the set of training input signals and 100% generalization for the set of test input signals, the set of input signals in the affordable margin memory 25 may also be examined as regards generalization performance. If errors in the binary output unit signals exist, the corresponding input signal is removed to the training signal memory 23 for re-training.

Accordingly, the binary neural network with the invented reiterative learning procedure can realize very stable and quick convergence in binary space for sets of input signals in the ranges of the classification boundaries, and also provide 100% generalization for the attained input signals with drastic reduction of the amount of computation, resulting in an extremely high generalization for unknown input signals. As a criterion of generalization performance, another threshold may be prepared instead of 100% to reduce the amounts of computation.

The advantages of the present invention will now be summarized.

In a multi-level neural network according to the present invention related to a reiterative learning procedure, quick and reliable convergence and very high generalization are achieved without stagnation of convergence speed and loss of margin to obtain the correct output signal.

In the reiterative learning procedure, the neural network can be trained and tested with minimum necessary training and test input signals respectively which are optimally allocated between the training signal and test signal memories from the attained input signals, and the control of the error perturbation parameters in the training process can provide quick and reliable convergence to obtain a desired output. A complete convergence in binary space can be obtained 100 to 10000 times faster than that in the previous learning procedure without dependency on the initial conditions of weighting factors.

An extremely high generalization ability is also achieved for sets of attained input signals in the ranges of the classification boundaries by control of the minimum margin in correct binary output unit signals, and by effectively removing the input signals which lie around classification boundaries to the training signal memory for training.

According to the present invention related to a learning procedure, quick and reliable convergence without dependence on initial conditions of weighting factors having small bits is achieved for a wide range of numbers of hidden units and smaller numbers of hidden layers, resulting in drastic reduction of the amounts of calculation and hardware complexity in comparison to prior learning procedures. A 100% generalization can also be achieved for the attained input signals without over-learning, resulting in an extremely high generalization for unknown input signals.

A multi-level neural network according to the present invention related to the learning procedure can be easily and flexibly designed to realize large scale multi-level logic circuits which are difficult to construct by prior procedures, can also be widely applied to neural networks for artificial intelligence systems, information retrieval systems, pattern recognition, data conversions, data compression and multi-level image processing in which complete and quick convergence and a very high generalization ability are necessary, and is furthermore applicable to communication systems.

From the foregoing it is apparent that a new and improved learning method for neural networks has been found. It should be understood of course that the embodiments disclosed are merely illustrative and are not intended to limit the scope of the invention. Reference should be made to the appended claims, therefore, for indicating the scope of the invention.

What is claimed is:

1. A learning procedure supervised by teacher signals for neural networks comprising:

means for generating an error signal for updating weighting factors in a training process of said neural network, so that said error signal has an opposite polarity to that of a difference signal derived by subtracting an output unit signal from the corresponding teacher signal for a set of training input signals, and has an amplitude which decreases accordance to a distance from said teacher signal, when an output unit signal is correct, and an absolute value of said difference signal is equal to or smaller than a first threshold for an error perturbation, means for generating an error signal for updating weighting factors, so that said error signal has the same polarity as that of said difference signal and an amplitude smaller than that of said difference signal, when said output unit signal is correct, and, said absolute value of said difference signal is larger than said first threshold for said error perturbation, means for detecting a maximum value among absolute values of difference signals derived by subtracting output unit signals from said teacher signals for a set of training input signals in output units when said output unit signal is wrong, and said absolute values of said difference signals are larger than a second threshold which provides a range for an output signal to be correct, means for decreasing said first threshold for the error perturbation, when said maximum value has become smaller than a third threshold, and means for updating said weighting factors by using said error signal.

2. A learning procedure supervised by multi-level teacher signals for multi-level networks comprising:

means for obtaining a multi-level output unit signal derived from an output signal of said multi-level neural network by comparing said output unit signal to multi-level thresholds, means for generating an error signal for updating weighting factors of said neural network, so that said error signal has an opposite polarity to that of a difference signal derived from subtracting an output unit signal from a corresponding multi-level teacher signal in an output unit wherein said multi-level output unit signal derived through said multi-level threshold means coincides with said corresponding multi-level teacher signal, and has an amplitude which decreases according to a distance from said multi-level teacher signal, when said output unit signal is correct and an absolute value of said difference signal is equal to or smaller than a fourth threshold for an error perturbation, means for generating an error signal for updating said weighting factors, so that said error signal has the same polarity as that of said difference signal on said output unit and an amplitude smaller than that of said difference signal, when said output unit signal is correct and said absolute value of said difference signal is larger than said fourth threshold for the error perturbation, means for detecting a maximum value among absolute values of said difference signals derived by subtracting said output unit signals from said corresponding multi-level teacher signals in output units wherein said multi-level output unit signals are different from said corresponding multi-level teacher signals for a set of training input signals, means for decreasing said fourth threshold for the error perturbation, when said maximum value has become smaller than a fifth threshold, means for updating said weighting factors by using said error signal.

3. A learning procedure supervised by a multi-level teacher signal for multi-level neural networks according to claim 2, wherein, said weighting factors are updated by using said error signals having the same polarities as those of difference signals and having amplitudes smaller by a sixth threshold than those of said difference signals in output units wherein multi-level output unit signals for said set of training input signals are different from the corresponding teacher signals, and after said maximum value has exceeded said fifth threshold, said fourth threshold is decreased.

4. A learning procedure supervised by a multi-level teacher signal for multi-level neural networks according to claim 3, wherein, said fourth and sixth thresholds are set to zero at an initial training stage, and after said training process is conducted, said fourth threshold is at least set to a value which is not zero, when said maximum value has exceeded a seventh threshold at a given number of training cycles.

5. A learning procedure supervised by a multi-level teacher signal for multi-level neural networks according to claim 3, wherein after said multi-level neural networks have achieved convergence for said set of training input signals such that all multi-level output unit signals coincide with said multi-level teacher signals, updating of weighting factors is continued until a minimum value among difference signals derived by subtracting output unit signals from said multi-level thresholds in output units, wherein said multi-level output unit signals coincide with said corresponding teacher signals, exceeds an eighth threshold.

6. A reiterative learning procedure supervised by a multi-level teacher signal for multi-level neural networks according to claim 2 wherein, in said training process, said multi-level neural network is trained with said set of training input signals stored in a training signal memory 10, 18, 23, and after said multi-level neural network has converged for said set of training input signals, the rest of attained input signals as a set of test input signals stored in a test signal memory 11, 19, 24 are then tested, and if erroneous multi-level output unit signals are detected, test input signals corresponding to said multi-level output unit signals are removed to said training signal memory 10, 18, 23 from said test signal memory 11, 19, 24 in a test process, and a learning procedure with said training and test processes is reiteratively performed until the number of said erroneous multi-level output unit signals becomes less than a ninth threshold in said test process.

7. A reiterative learning procedure supervised by a multi-level teacher signal for multi-level neural networks according to claim 6, wherein, when said multi-level neural network has converged for said training input signals in said training process, training input signals which have margins providing correct multi-level output unit signals larger than a tenth threshold are removed from said training signal memory 10, 18, 23 to said test signal memory 11, 19, 24, and said learning procedure with said training and test processes is reiteratively performed until the number of said erroneous multi-level output unit signals becomes less than said ninth threshold in said test process.

8. A reiterative learning procedure supervised by a multi-level teacher signal for multi-level neural networks according to claim 6, wherein, when said multi-level neural network has converged for said training input signals in said training process, the training input signals which have margins providing correct multi-level output unit signals larger than an eleventh threshold are removed from said training signal memory 18 to an affordable signal memory 20, and said learning procedure with said training and test processes is reiteratively performed until the number of said erroneous multi-level output unit signals becomes less than said ninth threshold in said test process.

9. A reiterative learning procedure supervised by a multi-level teacher signal for multi-level neural networks according to any one of claims 6 to 8, wherein, when said test is conducted in said test process after said multi-level neural network has converged for said training input signals, test input signals which have margins providing correct multi-level output unit signals larger than a twelfth threshold are removed from said test signal memory 18 to said affordable signal memory 20, and said learning procedure with said training and test processes is reiteratively performed until the number of said erroneous multi-level output unit signals becomes less than said ninth threshold in said test process.

10. A reiterative learning procedure supervised by a multi-level teacher signal for multi-level neural networks according to claim 9, wherein, if erroneous multi-level output unit signals are detected for input signals input from said affordable signal memory 20, said input signals are removed from said affordable signal memory 20 to said training memory 18, and said procedure with said training and test processes is reiteratively performed again until the number of said erroneous multi-level output unit signals becomes less than said ninth threshold in said test process without any erroneous output unit signals for input signals input from said affordable signal memory 20.

11. A learning procedure supervised by a multi-level teacher signal for multi-level neural networks according to claim 6, wherein, all multi-level patterns having a distributed representation which can be allocated to said output units are assigned as said set of teacher signals, in said training signal memory 10, 18, 23 only training input signals corresponding to each component in said set of teacher signals are stored as an initial set of training input signals with a set of corresponding teacher signals, and the rest of said attained input signals are stored as an initial set of test input signals with a set of corresponding teacher signals in said test signal memory 11, 19, 24.

12. A learning procedure supervised by a multi-level teacher signal for multi-level neural networks according to claim 2, wherein, in said training process, learning coefficients or/and momentum coefficients for updating said weighting factors are adjusted according to said number of erroneous multi-level output unit signals in said test process.

* * * * *